UNITED STATES PATENT OFFICE 2,092,080

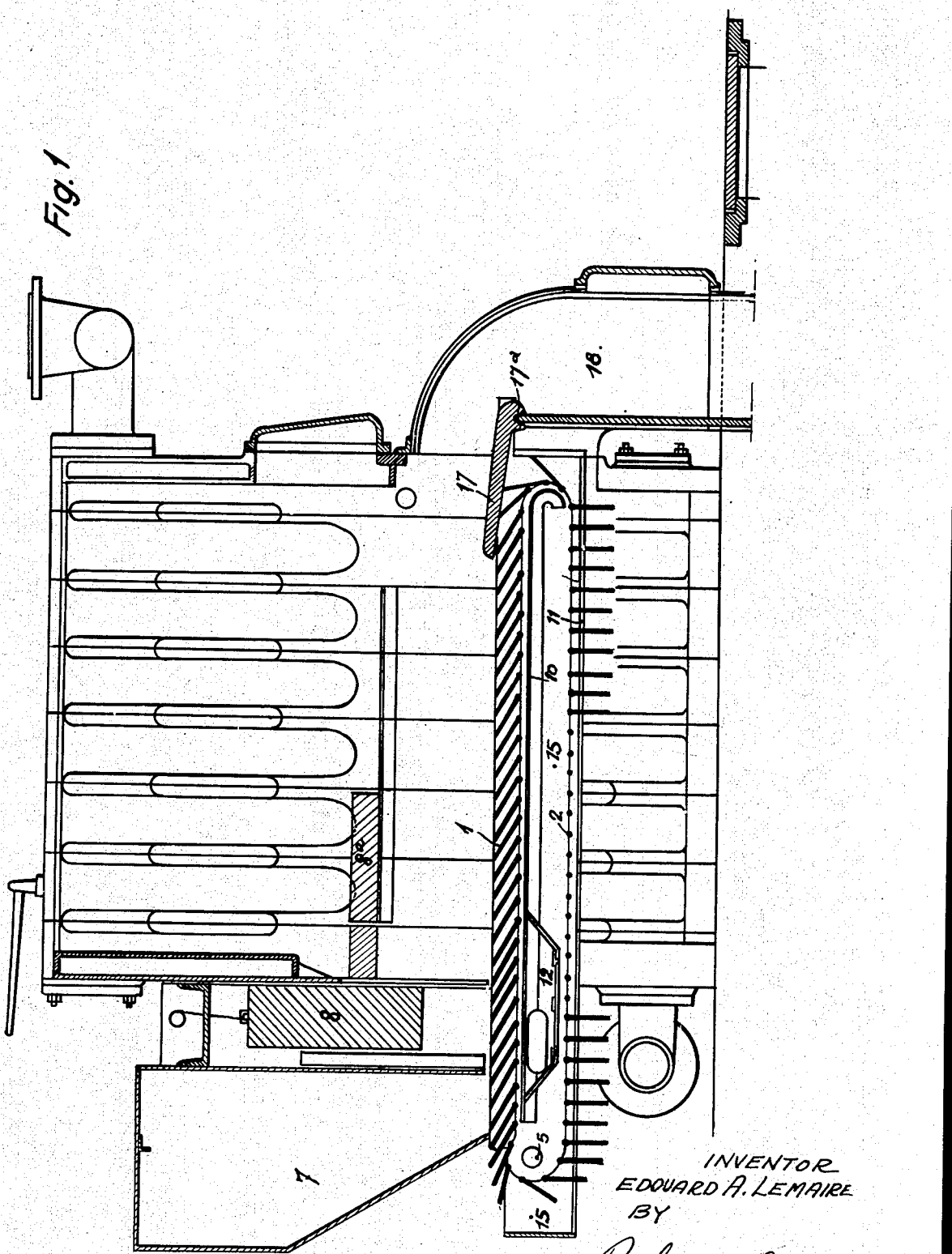

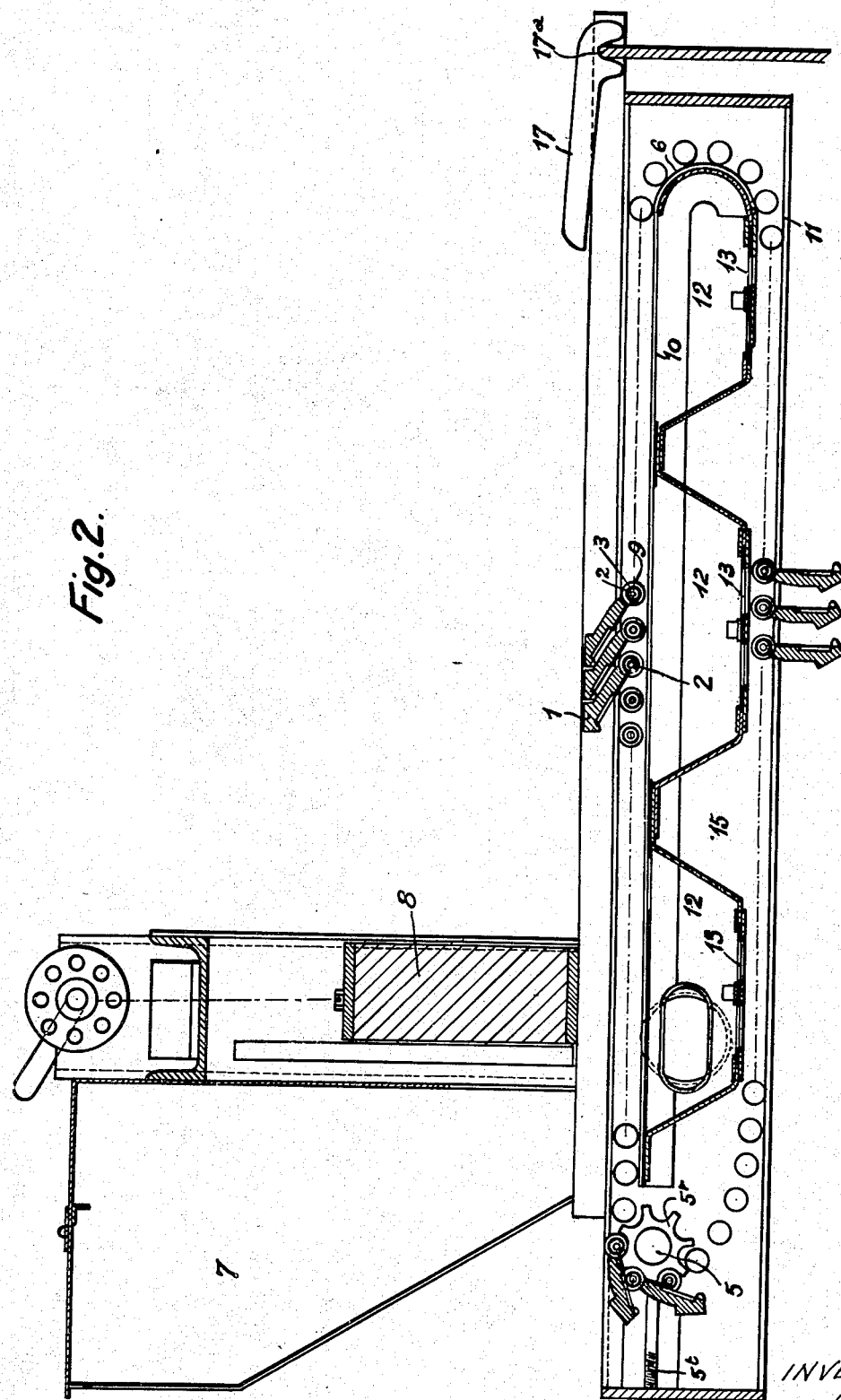

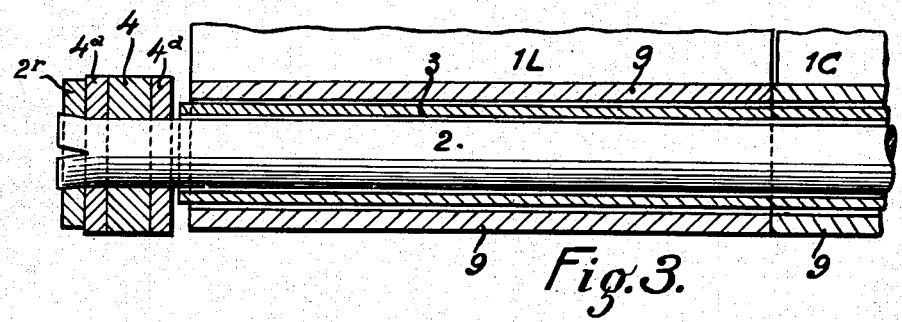
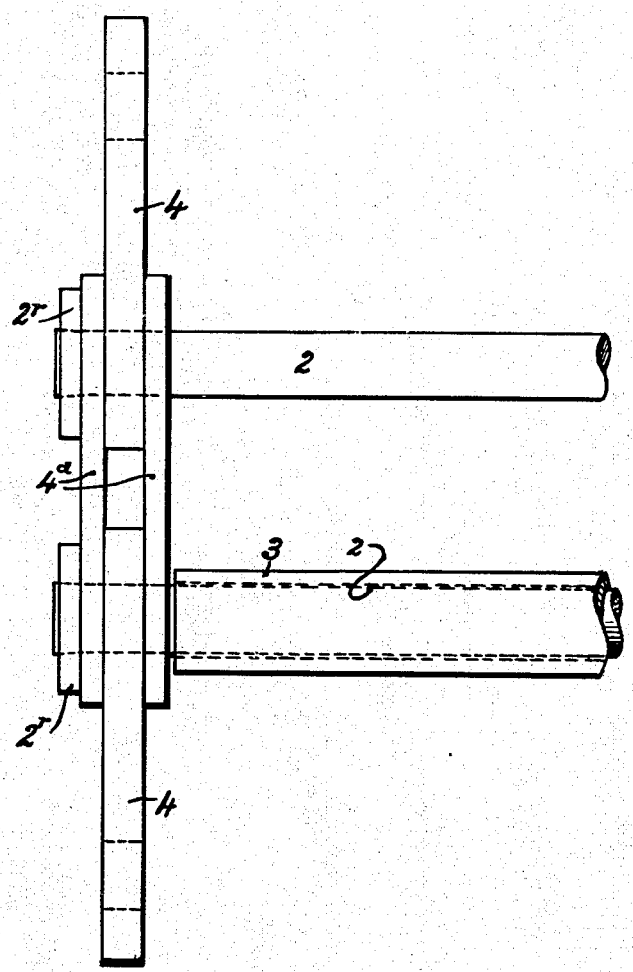
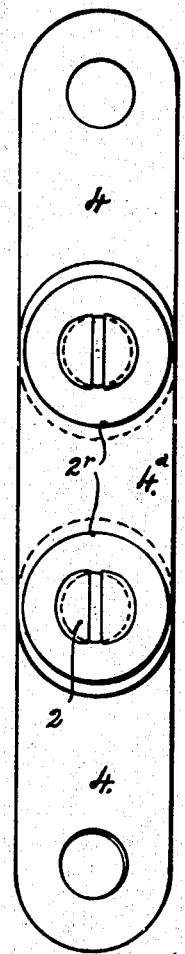

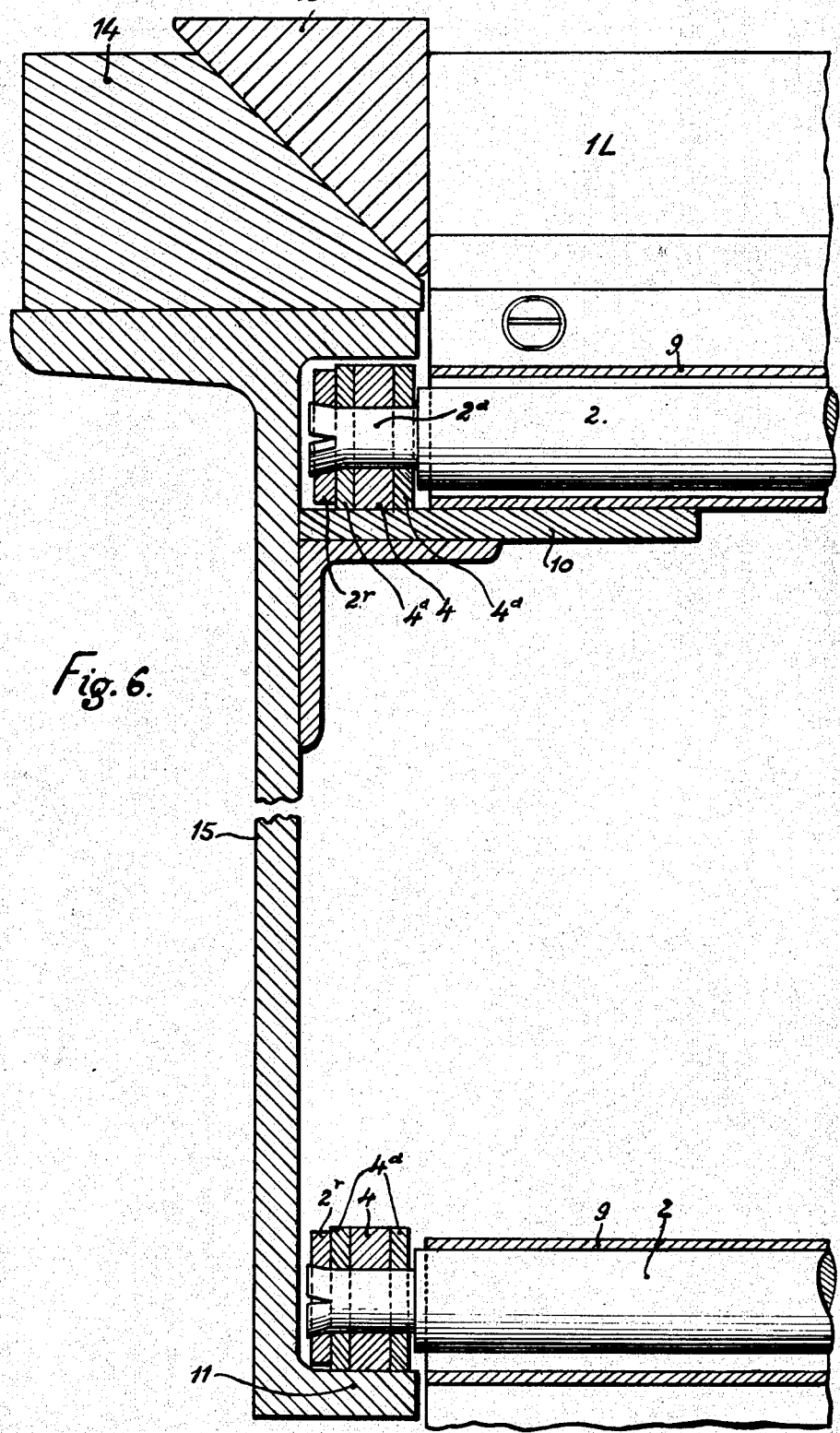

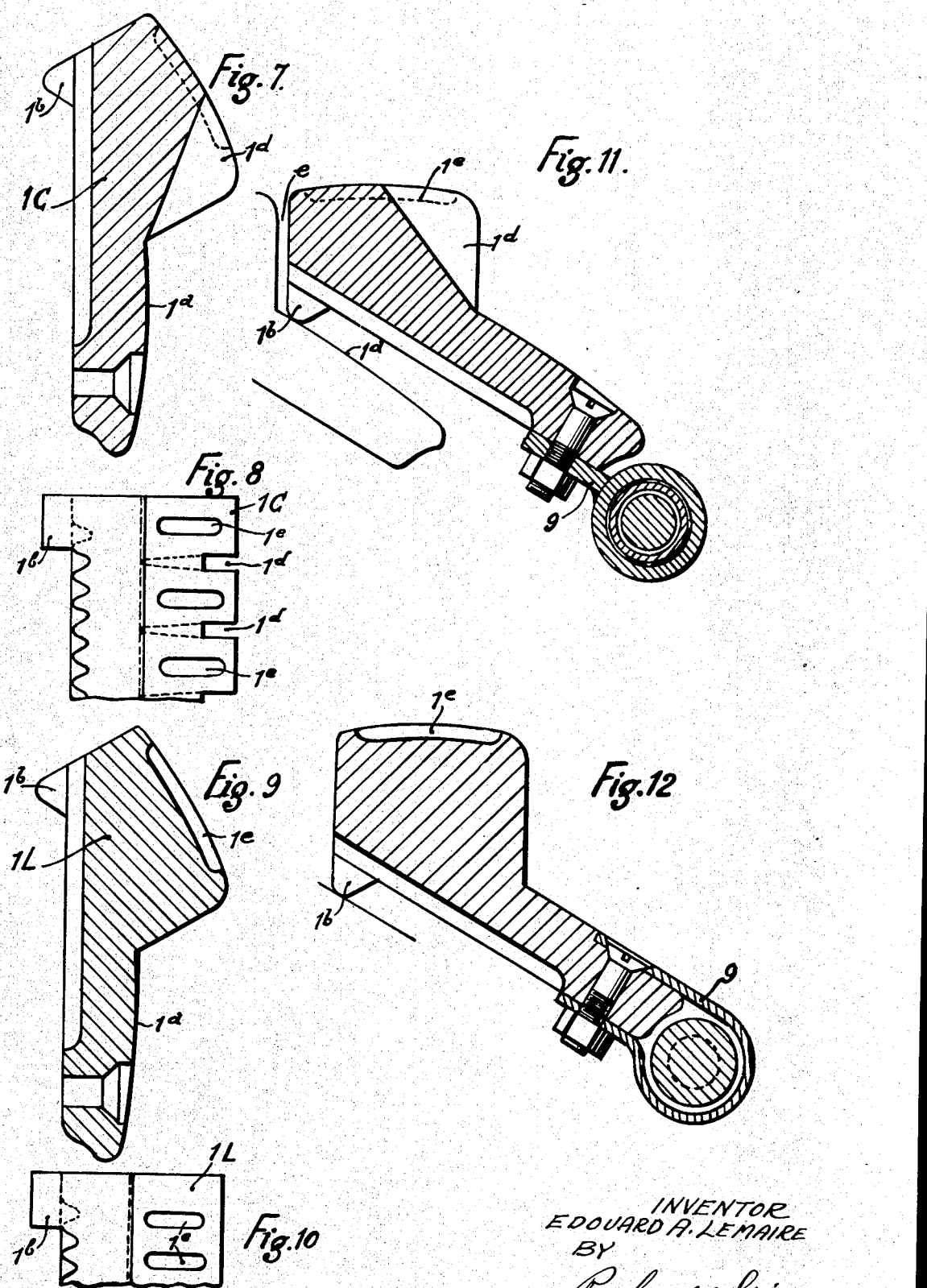

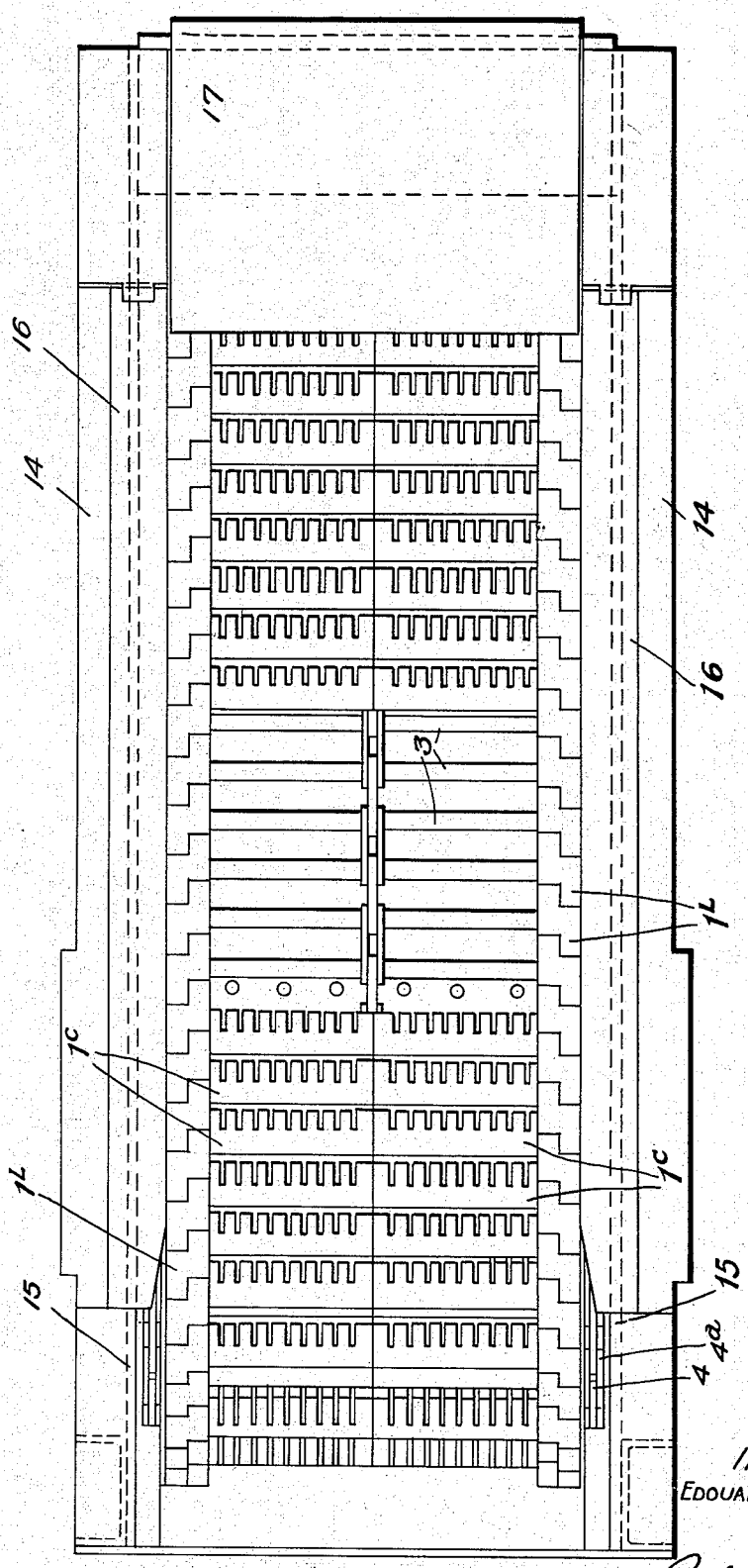

MECHANICALLY MOVED CHAIN GRATE

Edouard Auguste Lemaire, Grenoble, France, assignor to Societe Anonyme ditte: La Mure Combustibles et Industrie, Grenoble, France Application March 21, 1935, Serial No. 12,130
In France March 26, 1934

6 Claims. (Cl. 110—40)

This invention relates to a chain grate for small furnaces and refers more particularly to a chain grate for house boilers having a small grate surface.

The grate constructed according to the present invention is characterized by a chain in which the link rods constitute the pivots of small bars which extend between the opposite links of said chain, the alignment of the tables of said bars designed to form the grate surface being automatically established due to the fact that the bars of the upper strand of the chain rest one upon the other.

The grate chain is constituted by a chain having extended rods which are surrounded by tubular stages; they may also be provided at both ends with a shoulder designed to stop the links inwardly.

The links are stopped outwardly preferably by means of a conically bored ring locked by the spreading apart of the two members of the previously split rod end.

The small bars are provided on one side, preferably on the opposite side, with a bearing surface and with a resting boss constituted so as to leave a predetermined space for the draught, between two successive small bars, according to the size of the fuel to be burnt.

There is preferably one or more middle bars provided with blast notches upon every link rod according to the width of the grate and two side bars without notches.

The said bars are provided upon the surface exposed to the fire with recesses preferably coated with refractory cement.

The pivotal bearing of each of said bars is preferably constituted by a folded piece of sheet metal which forms a kind of clip or strap provided with an eye.

The chain is guided between border parts to which are added at the top two guides for the bars, one of said guides which is stationary presenting an incline upon which freely rests the other angle shaped part that bears on the other hand upon the edge of the bars of the upper chain strand.

Draught distributing boxes provided with a dust extracting device are placed between the two strands of the chain grate below the grate plane.

A heavy metal part pivotally mounted upon a horizontal shaft outside its center of gravity so as to come to bear by its own weight upon the end of the grate plane serves to remove the clinker.

The appended drawings show by way of example one mode of construction of a grate for small furnaces constructed according to the present invention.

Fig. 1 is a longitudinal sectional view showing diagramatically in elevation the grate applied to the furnace of a central heating boiler.

Fig. 2 is a longitudinal section in part diagrammatic illustrating the grate with its fittings.

Fig. 3 is a part transverse sectional view of the chain taken along the rod of one of the links.

Fig. 4 is a plan view of links and rods.

Fig. 5 is a corresponding side view.

Fig. 6 is a part transverse sectional view of the grate.

Figs. 7 and 8 are respectively a sectional view and a part plan view of a middle bar.

Figs. 9 and 10 are respectively a sectional view and a part plan view of a border bar.

Fig. 11 is a sectional view of a bar in combination with its pivotal support when normally in position.

Fig. 12 is a similar sectional view of a bar provided with another type of support.

Figure 13 is a plan view showing the front portion of the grate.

The grate illustrated in the appended drawings comprises a set of small bars 1, mounted upon the rod 2 of the chain links around which they may pivot. The chain has long rods 2 and tubular stays 3, as indicated in Fig. 3. It may also be provided with rods having narrower ends $2^a$ (Fig. 6). The rods are split or open at both ends for a few millimeters and they carry washers $2^r$ having a slightly conical bore which are designed to retain the links 4, $4^a$, $4^a$. This flaring of the washers $2^r$, ensures axial locking by simply spreading out the end opening with a tool.

The chains are very compact and the outer diameter of the end washers is approximately that of the links. Said devices have been devised in order to baffle the flow of air along the chains and to improve the division into compartments.

For very small sizes, the chain is fed by means of a shaft 5 provided with toothed wheels $5^r$ and travels at its other end upon a cylindrical guiding surface 6. For the usual chains a second shaft carrying also toothed wheels is substituted for the surface 6.

The shaft 5 is provided with a tightening device $5^t$ for the chain.

The depth of the coal upon the grate may be controlled by means of a coal hopper provided with a feed regulator 8.

A firing arch $8^a$ (Fig. 1) may be arranged near the feed regulator according to the grade of the fuel to be consumed. In the case of fuels which ignite with difficulty said arch may extend as far as the feed regulator 8.

The bars are pivotally mounted upon the chain rods. They hang freely upon the lower chain strand and on the upper strand owing to their overlapping they form a substantially flat horizontal surface upon which the coal is consumed.

The bars are provided to that end with a bearing surface $1^a$ on one side as will be seen in Fig. 7, and on the opposite side with a boss $1^b$ designed to press upon the bearing surface of the next bar; said surface and said boss are so constructed that the bars not only overlap each other but that between two adjacent bars there remains a free space $e$ for the draught. Said space has a predetermined width for every type of grate constructed for burning a fuel of a given size.

The bars may be constructed so as to form a unit between two opposite chain links but a plurality of members are preferably used, that is: one or more middle bars $1C$ (according to the width of the grate) provided with blast notches $1^d$, as shown in Figs. 7 and 8, and two side bars $1L$ without blast notches, as indicated in Figs. 6 and 9.

The side bars which have no blast notches compensate the action of the walls upon the coal bed as they cause a slight slackening of the combustion at these points where it tends to be more accelerated than in the middle.

The bars are shaped in such manner that each section should receive an equal amount of heat since this always ensures a good utilization of the metal. Their sides $1^a$ present moreover a general incline inferior to that of the natural descent of the coal with the object (1st) to prevent the pea coal from falling in the draught distributing boxes and obstruct them after a time, and (2nd) to compel the blast air directed by the notches $1^d$ to impinge obliquely upon the coal. This arrangement produces a very good distribution of the air for combustion and allows stronger blowing without disintegrating the layer of fuel. In this manner the rate of combustion may be substantially increased.

The bars are provided on the other hand upon their sides in contact with the fire with small recesses $1^e$. The object of said recesses is to reduce the heat upon that portion of the bar, care being taken to fill them with refractory cement or to leave the ashes which gather after a few days and act as lagging applied upon a considerable portion of the surface exposed to the fire. The ashes within the recesses are hardened by fire and soon form a hard coating which adheres to the metal and protects it.

The recesses $1^e$ are preferably filled with refractory cement so as to prevent the metal being acted upon by the fusible products that are found in anthracite coals. The operation may be effected by simply injecting upon the strongly heated bars water containing lime or other refractory materials which due to immediate vaporization leave a coating which adheres upon the metal.

The bars are all pivotally mounted upon the chain rods 2 or upon the tubular stays 3 surrounding them by means of a support 9 which may consist of a tube and a rib welded together as shown in Fig. 11; this support may also consist of a piece of sheet metal folded in the shape of a clip or strap provided with an eye, as seen in Fig. 12 in which the bar is fastened. Said support is mounted around the rod with considerable play so as to move freely and not prevent the pivotal movement of the bar.

The entire grate is moved by the rods 2 and slides slowly upon two upper side guides 10 and upon two lower flanges 11 of the frame (Fig. 6). The grate is situated above the transverse partitions which divide the draught distributing boxes 12 (Figs. 1 and 2) formed under the upper strand of the chain grate. The draught distributing boxes may be provided with doors 13 for the removal of ashes which may have fallen in said boxes.

The border parts of the frame preserve the chain from the action of the fire. They are also arranged for guiding the translating movement of the bars. A certain play must normally exist between their inner vertical sides and the ends of the bars in order to compensate for the expansion of the bars which varies according to the rate of working of the furnace. On the other hand however this play must be small so as to reduce the flow of the draught. In order to satisfy both conditions the border members are made in two parts; the part 14 which is stationary, as seen in Fig. 6, is bolted to the side members 15 of the frame and the other part 16 has the shape of a widely opened angle resting freely between the first member and the outer edge of the bars.

The air tightness resulting from the weight of the angle-shaped part is sufficient to prevent the passage of air without necessitating an excessive force for the advance movement of the grate. The part 16 the angle of which is calculated in such a manner as to prevent any wedging, follows the grate in its transverse expansion. It also bears at both ends upon abutments which prevent its being drawn along in the direction of the displacement of the bars. Said abutments are perpendicular to the direction of the movement of the upper portion of the grate in order to prevent every wedging action and putting out of alignment.

A cleaning device 17 pivotally mounted at $17^a$ presses upon the grate by its own weight and allows when necessary to remove the clinker that adheres to the bars. The clinker is subsequently emptied into the hopper 18.

What I claim and desire to secure by Letters Patent of the United States is:

1. A mechanically moved grate for small furnaces, which comprises links extending along opposite sides of the grate and rods extending across the grate and pivotally connecting the links to form a chain, bars pivotally mounted upon said chain rods, said bars comprising surfaces bearing one upon the other, whereby the upper surfaces of the bars in the upper chain strand come automatically in line to form the grate surface, and means for laterally guiding the chain and the bars.

2. A mechanically moved grate for small furnaces which comprises links extending along opposite sides of the grate and rods extending across the grate and pivotally connecting the links to form a chain, tubular stays around said rods to determine the distance between the links at opposite sides of the grate, grate bars pivotally mounted upon said tubular stays and having upper flat surfaces, said bars presenting surfaces bearing one upon the other, whereby the upper surfaces of the bars in the upper chain strand come automatically in line in such a manner as to constitute the grate surface, and means for laterally guiding the chain and the bars.

3. A mechanically moved grate for small furnaces which comprises links extending along opposite sides of the grate and rods extending across the grate and pivotally connecting the links to form a chain, said rods being provided with shoulders for determining the distance between links at opposite sides of the grates, and having split ends, washers formed with a conical opening which are locked by the drawing-apart of the split ends of the rods in order to prevent the removal of the links, grate bars pivotally mounted upon said chain rods and having upper flat surfaces, said bars presenting surfaces which bear one upon the other, whereby the upper surfaces of the bars in the upper chain strand come automatically in line in such a manner as to constitute the grate surface, and means for laterally guiding the chain and the bars.

4. A mechanically moved grate for small furnaces which comprises links extending along opposite sides of the grate and rods extending across the grate and pivotally connecting the links to form a chain, grate bars pivotally mounted upon said chain rods and having upper flat surfaces, supports constituted by a sheet metal part folded in the shape of a strap and provided with an eye for pivotally supporting said grate bars upon said chain rods, said bars presenting surfaces bearing one upon the other, whereby the upper surfaces of the bars in the upper chain strand come automatically in line in such a manner as to constitute the grate surface and means for laterally guiding the chain and the bars.

5. A mechanically moved grate for small furnaces which comprises links extending along opposite sides of the grate and rods extending across the grate and pivotally connecting the links to form a chain, two solid bars and at least one middle bar provided with notches, said bars being pivotally mounted upon every chain rod and presenting surfaces bearing one upon the other, whereby the surfaces of the bars in the upper chain strand come automatically in line in such a manner as to constitute the grate surface, and draught distributing boxes arranged beneath the upper chain strand.

6. A mechanically moved grate for small furnaces, which comprises links extending along opposite sides of the grate and rods extending across the grate and pivotally connecting the links to form a chain, tubular stays around said rods to determine the distance between the links at opposite sides of the grate, said rods having split ends, washers formed with a conical opening which are locked by the drawing-apart of the split ends of the rods in order to prevent the removal of the links, two solid border bars and at least one middle bar provided with notches, said bars being pivotally mounted upon every chain rod and presenting surfaces bearing one upon the other, whereby the surfaces of the bars in the upper chain strand come automatically in line in such a manner as to constitute the grate surface, draught distributing boxes arranged beneath the upper chain strand, longitudinal members for guiding and supporting on both sides the two chain strands, two other longitudinal members added on both sides to the upper chain strand, guiding members designed to guide the bars of said upper strand, one of the last-mentioned members which is stationary being formed with an incline, while the other one of the last-mentioned members is of angular shape and bears on one side upon said incline and on the other side against the edge of the bars in the upper chain strand.

EDOUARD AUGUSTE LEMAIRE.